UNITED STATES PATENT OFFICE.

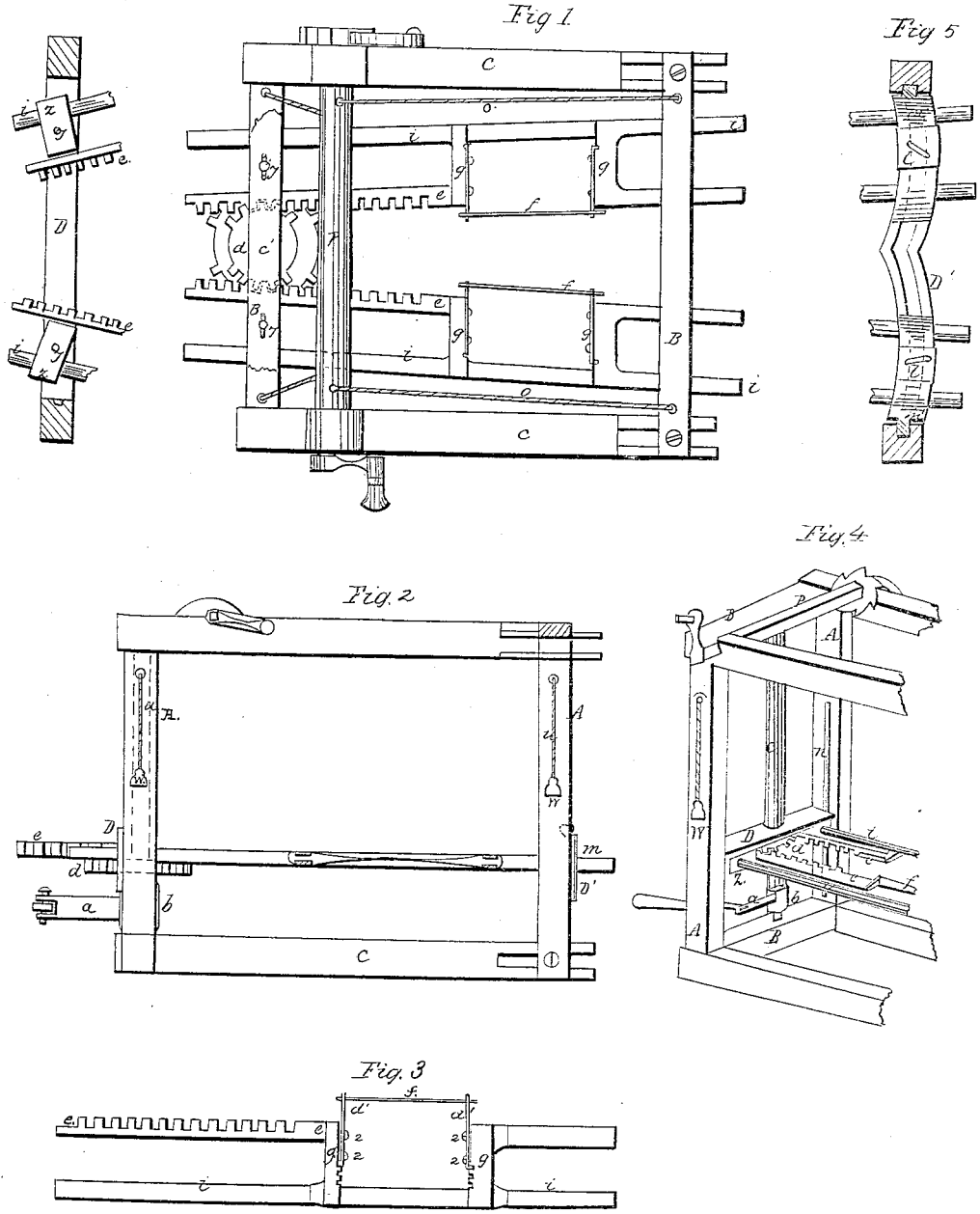

LEWIS S. FISHER, OF WAYNESBORO, PENNSYLVANIA.

MACHINE FOR SAWING MARBLE.

Specification of Letters Patent No. 15,419, dated July 29, 1856.

*To all whom it may concern:*

Be it known that I, LEWIS S. FISHER, of Waynesboro, in the county of Franklin and State of Pennsylvania, have invented certain new and useful Improvements in Machines for Sawing Marble; and I do hereby declare that the following is a full, clear, and exact description of the same, reference being had to the accompanying drawings, making a part of this specification.

The nature of my improvement consists in providing a pair of saws operated by sliding racks and a reciprocating cog wheel, with adjustable guides, in such a manner that the racks shall be kept in connection with the cog wheel in the changes of the saws in position to each other, in sawing the two sides of a block of marble wherein the shape required may be a trapezium of varied angular lines or a square as may be desired.

To enable others skilled in the art to construct and use my invention I will proceed to describe it as follows:

A A are uprights of a quadrangular frame, of which B B are cross girts, and C C ties or stringers. The posts A, A are provided with grooves $n$, $n$, in which slide the tongues of timbers D, D'. These timbers support the racks $e$ $e$ and sliding rods $i$ $i$, which with the arms $g$ $g$, constitute the saw frame.

$c'$ is an upright shaft of iron either formed of a square bar, or if round, furnished with a groove for receiving a sliding key of a cog wheel $d$, so as to admit of the raising and lowering thereof on the shaft. The lower part of the shaft is enlarged, forming a head $b$ in which is inserted a projecting arm $a$ to which the motive power may be attached for giving the shaft and cog-wheel a reciprocating movement, which is communicated to the racks $e$ $e$.

$o$, $o$, are elevating cords winding around the roller $p$. They pass through holes in the cross girts B B and are attached to timbers D D'. The roller $p$ is furnished with a ratchet wheel and pawl at one end and crank handle at the other. By the turning thereof the timbers and saws may be raised when necessary, as in placing the block of marble under the saws $f$, $f$. $u$ $u$ represent other cords attached to timbers D D', which pass through holes in the uprights A A and have attached to their end weights $w$ $w$. All of these cords are provided with pulleys.

In one of the timbers D suitable mortises or openings are made for the reception of the cog wheel $d$, the racks $e$ $e$ and guide blocks $z$ $z$ for sustaining the racks in mesh with the cog wheel. Those guides are connected with the timber D, by pivot bolts $y$, $y$, on which they have slight motion, and it is through these guide blocks that the sliding rods $i$ $i$ have their movement. The other timber D' is also mortised with a recess, but instead of being like the other, it is vertical, and is so formed that the sides of the mortise make a segment of a circle (as seen in Fig. 5). In those segmental grooves the tongues of guides $m'$, $m'$, enter, the guides being secured at any position to each other by strap clamps $l$ $l$ and suitable set screws. It is through these guides that the rear ends of the rods $i$ $i$ of the saw frame pass and are guided. The rear portion of the frame instead of being fixed, may be moved by sliding the tenons of the posts and cross girts, for the purpose of placing the saws nearer the cog wheel $d$ and thus increasing the angle of the saws.

The improved saw frame is as follows; (see Fig. 3) and consists of a cast iron frame, $i$ $i$, rods thereof; $g$, $g$, arms at right angles thereto and rack $e$. To the sides of the arms are attached by set screws 2, 2 the saw clamps $d'$ $d'$, those clamps having a slot or opening through which the body of the screw bolt passes, thus allowing the saw $f$, which is slipped over stubs on the outer ends of $d'$ $d'$ not only to be drawn tight by the turning of the set screws, but by the slot and $d'$ the ends of the saws may be adjusted in the frame and the angle thus regulated.

The use and object of cords $u$ $u$ and weights $w$, $w$, is to counterbalance the weight of the saw and heavy frame, upon the block of marble, when undergoing the operation of being sawed, it being understood that the windlass in that case is released.

By my improvement of the pivoted guide blocks $z$, $z$, in combination with the guide blocks $m$, $m$, adjusted in segments of a circle formed in the rear timber D', I am not only enabled to preserve the mesh of the racks $e$, $e$, with the cog wheel $d$, but in a most efficient and accurate manner adjust the angle of the saws to each other for the purpose set forth.

Having described my improvement what I claim as my invention and desire to secure by Letters Patent is—

Operating the saws $f\ f$, by racks $e, e$, and cog wheel $d$, in combination with the guides $z\ z$ and $m, m$, when arranged and operated in the manner and for the purposes set forth in the foregoing specification.

In testimony whereof I have hereunto signed my name before two subscribing witnesses.

L. S. FISHER.

Witnesses:
JOHN PHILIPS,
JOHN NILL.